United States Patent
Masuda et al.

(10) Patent No.: US 7,966,845 B2
(45) Date of Patent: Jun. 28, 2011

(54) GLASS-SHAPING MOLD AND METHOD FOR MANUFACTURING THE SAME

(75) Inventors: Jun Masuda, Mishima (JP); Takaharu Tashiro, Gotemba (JP); Hisanori Fuwa, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/565,789

(22) Filed: Sep. 24, 2009

(65) Prior Publication Data

US 2010/0011815 A1      Jan. 21, 2010

Related U.S. Application Data

(63) Continuation of application No. PCT/JP2008/054951, filed on Mar. 18, 2008.

(30) Foreign Application Priority Data

Apr. 10, 2007 (JP) ................................. 2007-103179
Feb. 15, 2008 (JP) ................................. 2008-035214
Feb. 15, 2008 (JP) ................................. 2008-035215

(51) Int. Cl.
*C03B 11/08* (2006.01)
*C03B 9/48* (2006.01)

(52) U.S. Cl. ............ 65/374.1; 65/374.12; 65/24; 65/26; 148/95

(58) Field of Classification Search ................ 65/24, 26, 65/374.1–374.15; 148/95
See application file for complete search history.

(56) References Cited

U.S. PATENT DOCUMENTS

| 5,628,807 | A | 5/1997 | Yoshitake et al. |
| 5,964,398 | A | 10/1999 | Kohno et al. |
| 7,377,477 | B2 | 5/2008 | Lucek et al. |
| 2004/0211222 | A1* | 10/2004 | Hosoe ........................ 65/374.12 |
| 2009/0178737 | A1 | 7/2009 | Masuda |
| 2009/0236016 | A1 | 9/2009 | Masuda et al. |
| 2010/0011815 | A1 | 1/2010 | Masuda et al. |

FOREIGN PATENT DOCUMENTS

| CN | 1126703 | 7/1996 |
| CN | 1847178 | 10/2006 |
| EP | 1061051 | 12/2000 |
| EP | 1894895 | 3/2008 |
| JP | S49-51112 | 5/1974 |
| JP | 51-109224 A | 9/1976 |

(Continued)

OTHER PUBLICATIONS

Office Action issued in U.S. Appl. No. 11/573,501 on Jan. 20, 2010.

(Continued)

*Primary Examiner* — Matthew J Daniels
*Assistant Examiner* — Jodi Cohen
(74) *Attorney, Agent, or Firm* — DLA Piper LLP US

(57) ABSTRACT

A glass-shaping mold includes a steel base member, and a crystallized, machined layer, an intermediate layer and a mold-releasing layer which are sequentially formed on the base member. The machined layer is a layer of nickel alloy containing phosphorus. The intermediate layer is a layer formed of chromium, nickel, copper or cobalt. Alternatively, the intermediate layer is a layer of an alloy layer containing at least one of these elements. The mold-releasing layer is a layer of an alloy containing iridium and rhenium.

2 Claims, 2 Drawing Sheets

FOREIGN PATENT DOCUMENTS

| JP | 56-141922 A | 11/1981 |
|---|---|---|
| JP | S60-114516 | 6/1985 |
| JP | 03-90539 A | 4/1991 |
| JP | 05-156350 A | 6/1993 |
| JP | 07-053233 | 2/1995 |
| JP | 08-143320 | 6/1996 |
| JP | 08-188441 | 7/1996 |
| JP | 09-295818 | 11/1997 |
| JP | 10-8198 | 1/1998 |
| JP | 10-500735 A | 1/1998 |
| JP | 11-157852 A | 6/1999 |
| JP | 11-225783 | 8/1999 |
| JP | 11-335783 A | 12/1999 |
| JP | 2001-302260 | 10/2001 |
| JP | 2002-029772 | 1/2002 |
| JP | 2002-060239 | 2/2002 |
| JP | 2002-348129 | 12/2002 |
| JP | 2003-048723 | 2/2003 |
| JP | 2003-073134 | 3/2003 |
| JP | 2004-059368 | 2/2004 |
| JP | 2006-290700 | 10/2006 |
| JP | 2007-001822 | 1/2007 |
| JP | 2008-169107 | 7/2008 |
| WO | WO-00/40516 | 7/2000 |
| WO | WO 2006-137225 | 12/2006 |

OTHER PUBLICATIONS

International Preliminary Report of Patentability issued in PCT/JP2008/054951 on Oct. 22, 2009.
International Preliminary Report on Patentability in PCT/JP06/309478 mailed Jan. 10, 2008.
Extended European Search Report filed in application EP 06746287 dated Jan. 30, 2009.
Abdel-Hady, E. E.: "Study of microstructural defects in steel using positron annihilation lifetime technique," Nuclear Instruments & Methods in Physics Research, Section B: Beam Interactions with Materials and Atoms, Elsevier, Amsterdam, NL, vol. 221, Jul. 1, 2004, pp. 225-229, XP004510654.
Ohmori, Y.; Sugisawa, S.: "The Precipitation of Carbides during Tempering of High Carbon Martensite," Trans. Jim, vol. 12, 1971, pp. 170-178, XP002506985.
Agarewala R.C. et al.: "Electroless Alloy/Composite Coatings: A Review," Sadhana, Indian Academy of Sciences, Bangalore, IN, vol. 28, No. 3/4, Jan. 1, 2003, pp. 475-493, XP002450878, ISSN: 0256-2499.
Balaraju J. N. et al.: "Electroless NI-P Composite Coatings," Journal of Applied Electrochemistry, Springer, Dordrecht, NL, vol. 33, No. 9, Sep. 1, 2003, pp. 807-816, XP001220875, ISSN: 0021-891X.
Zhang, Y.Z.; Wu, Y.Y.; Yao, M.: "Fatigue properties of electroless deposited steel," Journal of Materials Sciences Letters, vol. 15, 1996, pp. 1364-1366, XP002507041.
ASM Handbook. vol. 4, Heat Treating. "Carbon Content" Revised by Michael Wisti and Mandar Hingwe, Atmosphere Annealing, Inc. 1991.
ASM Handbook. vol. 4, Heat Treating. "Alloy Content" Revised by Michael Wisti and Mandar Hingwe, Atmosphere Annealing, Inc. 1991.
M-W Online. die. Jul. 31, 2009. <http://www.merriam-webster.com/dictionary/die.
International Search Report PCT/JP06/309478 mailed Aug. 8, 2006.
International Search Report of PCT/JP2007/073955 published Mar. 11, 2008.
English Abstract of JP 11-335783 published Dec. 7, 1999.
Machine English Translation of JP 11-335783 published Dec. 7, 1999.
English Abstract of JP 11-157852 published Jun. 15, 1999.
Machine English Translation of JP 11-157852 published Jun. 15, 1999.
English Abstract of 08-188441 published Jul. 23, 1996.
Machine English Translation of JP 08-188441 published Jul. 23, 1996.
English Abstract of JP S60-114516 published Jun. 21, 1985.
English Abstract of JP 09-295818 published Nov. 18, 1997.
Machine English Translation of JP 09-295818 published Nov. 18, 1997.
English Abstract of WO 2006-137225 published Dec. 28, 2006.
English Language Translation of International Preliminary Report of Patentability (IPRP) issued Jun. 25, 2009 in PCT/JP2007/073955.
International Search Report of PCT/JP2007/073956 issued Mar. 11, 2008.
English abstract of JP-2008-169107 published Jul. 24, 2008.
Machine English language translation of JP-2008-169107 published Jul. 24, 2008.
International Preliminary Report on Patentability issued Jun. 25, 2009 on PCT/JP2007/073956.
English abstract of JP-2007-001822 published Jan. 11, 2007.
Machine English language translation of JP-2007-001822 published Jan. 11, 2007.
English Language Abstract of JP 05-156350 published Jun. 22, 1993.
English Langauge Translation of JP 05-156350 published Jun. 22, 1993.
English Language Abstract of JP 2002-060239 published Feb. 26, 2002.
English Language Translation of JP 2002-060239 published Feb. 26, 2002.
Machine English Language Translation of WO 2006-137225 published Dec. 28, 2006.
English Abstract of CN 1126703 published Jul. 17, 1996.
English Abstract of JP 03-90539 published Apr. 16, 1991.
English Abstract of JP 10-500735 published Jan. 20, 1998.
English Abstract of JP 56-141922 published Nov. 5, 1981.
English language abstract of JP-2002-348129.
English language abstract of JP-2001-302260.
English language abstract of JP-2003-073134.
English language abstract of JP-2006-290700.
English language abstract of CN-1847178.
English language abstract of JP-2004-059368.
English language abstract of JP-2003-048723.
English language abstract of JP-08-048723.
English language abstract of JP-2002-029772.
International Search Report of PCT/JP2008/054951 mailed Jun. 17, 2008.
Machine English language translation of JP-2002-318129.
Machine English language translation of JP-2001-302260.
Machine English language translation of JP-2003-073134.
Machine English language translation of JP-2006-290700.
Machine English language translation of JP-2004-059368.
Machine English language translation of JP-2003-048723.
Machine English langauge translation of JP-08-143320.
Machine English language translation of JP-2002-029772.
English Language Abstract of JP 10-8198 published Jan. 1, 1998.
Machine English Language Translation of JP 10-8198 published Jan. 1, 1998.
Image File Wrapper of related U.S. Appl. No. 11/573,501 electronically captured on Dec. 1, 2010.
Image File Wrapper of related U.S. Appl. No. 12/482,497 electronically captured on Dec. 1, 2010.
Image File Wrapper of related U.S. Appl. No. 12/473,360 electronically captured on Dec. 1, 2010.
English Abstract of JP 11-225783 published Aug. 24, 1999.
English Language Translation of JP 11-225783 published Aug. 24, 1999.
German Office Action issued in DE Appl 112007003040.2-45 on Aug. 16, 2010.
English Translation of German Office Action issued in DE Appl 112007003040.2-45 on Aug. 16, 2010.
English language abstract of JP-08-143320 published Jun. 4, 1996.
English Abstract of JP 07-053233 published Feb. 1995.
English Language Translation of JP 07-053233 published Feb. 1995.
Image File Wrapper of related U.S. Appl. No. 11/573,501 electronically captured from Dec. 2, 2010 to Dec. 30, 2010.

* cited by examiner

GLASS-SHAPING MOLD AND METHOD FOR MANUFACTURING THE SAME

CROSS REFERENCE TO RELATED APPLICATIONS

This is a Continuation Application of PCT Application No. PCT/JP2008/054951, filed Mar. 18, 2008, which was published under PCT Article 21(2) in Japanese.

This application is based upon and claims the benefit of priority from prior Japanese Patent Applications No. 2007-103179, filed Apr. 10, 2007; No. 2008-035214, filed Feb. 15, 2008; and No. 2008-035215, filed Feb. 15, 2008, the entire contents of all of which are incorporated herein by reference.

BACKGROUND OF THE INVENTION

1. Field of the Invention

The present invention relates to a glass-shaping mold used for forming an optical element having a precise shape, and also to a method for manufacturing the mold.

2. Description of the Related Art

As is well known, in the field of plastics molding, high-precision processing technology employing shaping molds is established, and mass production of optical elements having a precise shape (such as diffraction gratings) can be put to practical use. A mold used for this purpose is fabricated by providing a nonelectrolyte Ni—P plating layer on the surface of a base member and processing the plating layer with high precision by use of a turning diamond tool. When this mold is applied to glass-shaping, the Ni—P layer cannot provide reliable releasing characteristics with respect to glass, and a mold-releasing film has to be formed. For example, Jpn. Pat. Appln. KOKAI Publication No. 2002-29772 (Patent Document 1) discloses a mold-releasing film made of W, Pt, Pd or Ir, or an alloy of these metals. In the case of Patent Document 1, however, the higher the shaping temperature is, the worse the surface roughness of the mold-releasing film becomes.

BRIEF SUMMARY OF THE INVENTION

An object of the present invention is to provide a glass-shaping mold which enables precise working by preventing the surface roughness of a mold-releasing layer from being degraded during shaping due to the presence of a crystallized, machined layer.

Another object of the present invention is to provide a method for manufacturing a glass-shaping mold which enables precise working by providing a machined layer on the surface of a base member, crystallizing the machined layer by performing heat treatment, and subsequently forming a mold-releasing layer, or forming both the intermediate layer and the mold-releasing layer, so as to prevent the surface roughness of the mold-releasing layer from being degraded.

1) To achieve the above objects, a glass-shaping mold according to the present invention comprises a steel base member, and a crystallized, machined layer and a mold-releasing layer which are sequentially formed on the base member. The glass-shaping mold is characterized in that the machined layer is a layer of a nickel alloy layer containing phosphorus and the mold-releasing layer is a layer of an alloy containing iridium and rhenium.

2) A method of manufacturing a glass-shaping mold according to the present invention is used for manufacturing a glass-shaping mold that comprises a steel base member, and a crystallized, machined layer and a mold-releasing layer which are sequentially formed on the base member. The method is characterized in that the machined layer is formed on the base member and is then heated to be crystallized, and subsequently the mold-releasing layer is formed.

3) A glass-shaping mold according to the present invention comprises a steel base member, and a crystallized, machined layer, an intermediate layer and a mold-releasing layer which are sequentially formed on the base member. The glass-shaping mold is characterized in that the machined layer is a layer of nickel alloy layer containing phosphorus, the intermediate layer is either a layer formed of chromium, nickel, copper or cobalt, or a layer of these elements, and the releasing layer is a layer of an alloy containing iridium and rhenium.

4) A method of manufacturing a glass-shaping mold according to the present invention is used for manufacturing a glass-shaping mold that comprises a steel base member, and a machined layer, an intermediate layer and a mold-releasing layer which are sequentially formed on the base member. The method is characterized in that the machined layer is formed on the base member and is then heated to be crystallized, and subsequently the intermediate layer and the mold-releasing layer are formed sequentially.

A glass-shaping mold according to the present invention employs a crystallized, machined layer. The presence of this layer prevents the surface roughness of the mold-releasing layer from being degraded and thus enables precise working. A method of manufacturing a glass-shaping mold according the present invention first forms a machined layer on a base member and then heats the machined layer to be crystallized, and subsequently forms the mold-releasing layer or forms both the intermediate layer and the mold-releasing layer. This process prevents the surface roughness of the mold-releasing layer from being degraded and thus enables precise working.

DETAILED DESCRIPTION OF THE INVENTION

The present invention will now be described in detail.

In the present invention, the machined layer is required to enable the turning diamond tool to perform precise working. It is preferable that a phosphorus (P) concentration in the machined layer is not less than 1% by weight and not more than 15% by weight. If the P concentration is less than 1% by weight, the machined characteristic is degraded. If the P concentration exceeds 15% by weight, the machined layer tends to be brittle. The machined layer may contain not only nickel (Ni) and phosphorus (P) but also boron (B), tungsten (W), molybdenum (Mo), rhenium (Re), etc.

In the present invention, the mold-releasing layer functions to maintain the mold-releasing characteristic with reference to glass. An Ir—Pt alloy may have an excellent mold-releasing characteristic, but if it is heated to approximately 500° C.

or higher, the Ni and P contained in the machined layer adversely affect the surface roughness. In addition, the mold-releasing characteristic deteriorates, and the glass may fuse and adhere. Where the mold-releasing layer is formed of an Ir—Re alloy, the surface roughness does not deteriorate. However, the mold-releasing characteristic may not be satisfactory, and the glass may fuse and adhere. The inventors made researches and discovered that a mold-releasing layer formed of an Ir—Re—C alloy does not cause a deterioration in the surface roughness and yet maintains an excellent mold-releasing characteristic without fusion and adhesion of glass.

That is, in the present invention, it is desirable that the mold-releasing layer contain C, and the mold-releasing characteristic is significantly improved when C is contained. The C concentration is preferably not less than 1 at % and not more than 50 at %. If the C concentration is less than 1 at %, the mold-releasing characteristic cannot be much improved. If the C concentration exceeds 50 at %, the oxidation resistance of the mold-releasing layer is degraded.

In the present invention, the intermediate layer serves to increase the adhesion between the machined layer and the mold-releasing layer. A material suitable for forming the intermediate layer is chromium (Cr), nickel (Ni), copper (Cu) and cobalt (Co).

In the manufacturing method according to the present invention, the machined layer is in an amorphous state when it is formed, and is then heated to have a crystalline state so as to form a mold-releasing layer (alternatively, both an intermediate layer and a mold-releasing layer). In the invention set forth above in (4), if the crystalline structure of the machined layer changes after the intermediate layer and the mold-releasing layer are formed, large stress is generated at the interface between the intermediate layer and the mold-releasing layer. As a result, the mold-releasing layer and the intermediate layer may separate.

A description will now be given of specific examples of the present invention.

EXAMPLE 1

Figure 1:
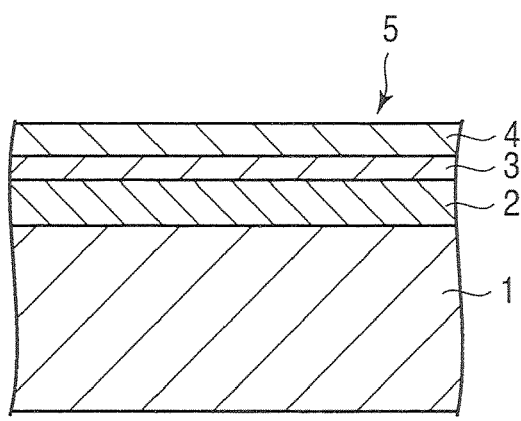
FIG. 1 is a partial cross section showing a glass-shaping mold according to Example 1 of the present invention.

FIG. 1 is a partial cross section showing a glass-shaping mold according to Example 1 of the present invention. In FIG. 1, reference numeral 1 denotes a steel base member. A crystallized, machined layer 2, an intermediate layer 3 and a mold-releasing layer 4 are formed on the base member 1 sequentially. The machined layer 2 is a layer of a nickel alloy containing 12 wt % of P (phosphorus). The intermediate layer 3 is a layer made of chromium (Cr). The mold-releasing layer 4 is a layer of an alloy containing iridium (Ir) and rhenium (Re).

The glass-shaping mold 5 shown in FIG. 1 is manufactured as follows: First, a nonelectrolyte Ni—P coating having a thickness of 100 μm was formed on the steel base member 1 and was then subject to heat treatment at 530° C. for two hours. The Ni—P coating was crystallized, thereby forming the machined layer 2. After the machined layer 2 was worked by means of a turning diamond tool, an intermediate layer 3 made of Cr and having a thickness of 50 nm and a mold-releasing layer 4 made of Ir-50 wt % Re and having a thickness of 300 nm were formed by sputtering. In this manner, the glass-shaping mold 5 was manufactured.

As shown in FIG. 1, the glass-shaping mold 5 according to Example 1 has a structure wherein the base member 1 is overlaid with: a nickel alloy layer (machined layer) 2 containing 12% by weight of P; an intermediate layer 3 made of chromium; and a mold-releasing layer 4 containing Ir and Re. These layers are formed sequentially. When the mold 5 is manufactured, the machined layer 2 is formed and is then heated for crystallization. Subsequently, the intermediate layer 3 and the mold-releasing layer 4 are sequentially formed. Thus, the surface roughness of the mold-releasing layer 4 is not degraded during shaping, and precise working is thus realized.

Figure 2:
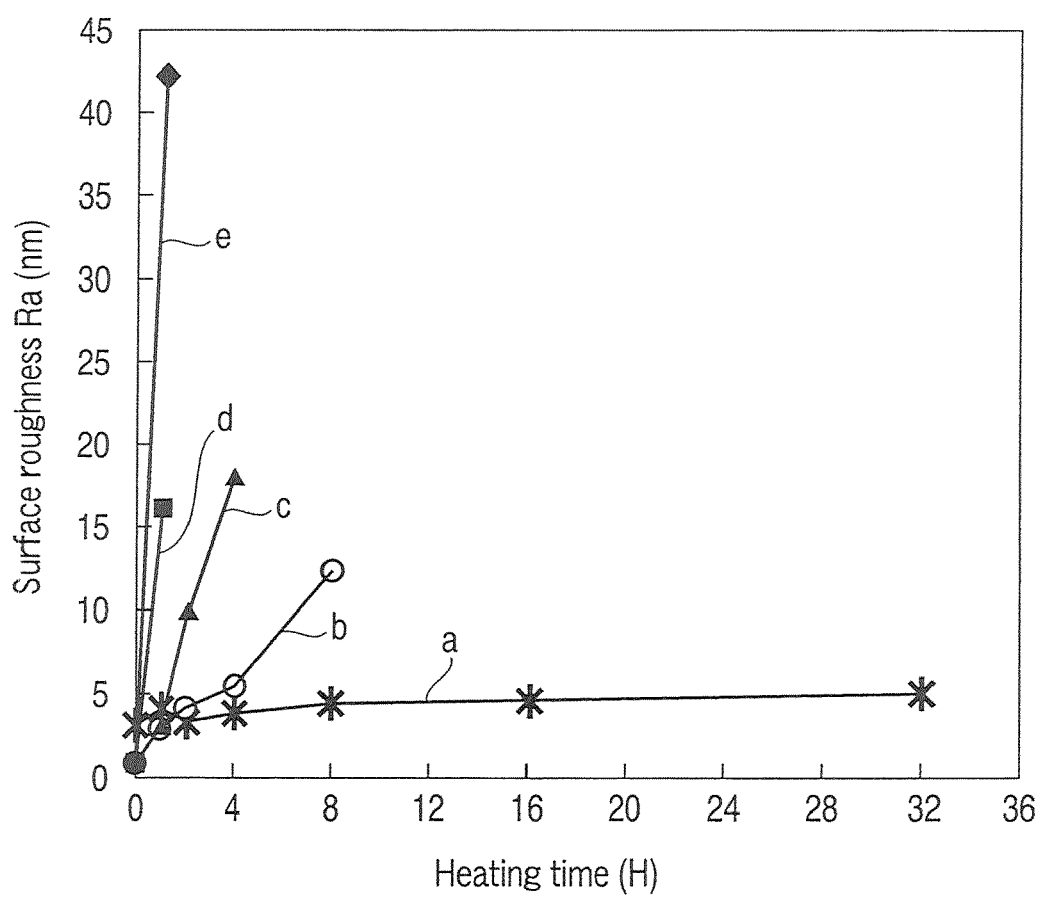
FIG. 2 is a characteristic diagram showing the relationships between the surface roughness measured after heating and the heating time, the relationships being examined with respect to the mold according to Example 1 and a mold according to a Comparative Example.

The surface roughness was actually measured after heat treatment performed at 570° C., using the mold according to Example 1 and the molds according to Comparative Examples 1-4. The result is shown in FIG. 2. In FIG. 2, symbol a indicates the case where the steel compositions of the mold-releasing layer, intermediate layer and machined layer are (Re—In), Cr and (Ni—P), respectively (Example). Symbol b indicates the case where the same steel compositions are (Pt—Ir), Cr and (Ni—P), respectively (Comparative Example 1). Symbol c indicates the case where the same steel compositions are Ir, $\bar{N}$i and (Ni—P), respectively (Comparative Example 2). Symbol d indicates the case where the same steel compositions are Pt, $\bar{N}$i and (Ni—P), respectively (Comparative Example 3). Symbol e indicates the case where the same steel compositions are (P$\bar{t}$—Ir), Ni and (Ni—P), respectively (Comparative Example 4).

As can be understood from FIG. 2, the surface roughness was degraded within 8 hours (H) in the cases of Comparative Examples 1-4. In the case of Example 1, in contrast, the surface roughness Ra remained at 5 nm even after 32 hours elapsed. It should therefore be clear that the present invention is superior to the Comparative Examples.

EXAMPLE 2

Figure 3:
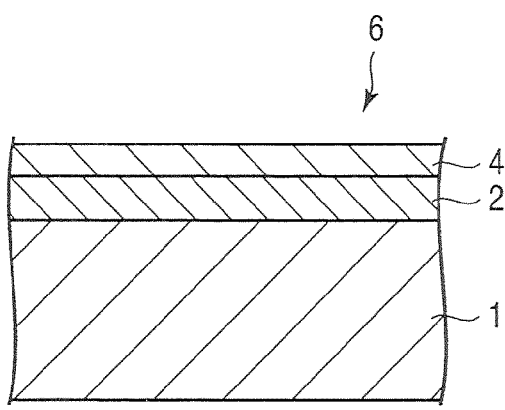
FIG. 3 is a partial cross section showing a glass-shaping mold according to Example 2 of the present invention.

FIG. 3 is a partial cross section showing a glass-shaping mold according to Example 2 of the present invention. The corresponding members to those in FIG. 1 are denoted by the same reference numerals, and a detailed description of them will be omitted. The glass-shaping mold 6 has a structure wherein a steel base member 1 is overlaid with a crystallized, machined layer 2 and a mold releasing layer 4 which are sequentially formed.

The glass-shaping mold 6 shown in FIG. 3 is manufactured as follows: First, a nonelectrolyte Ni—P coating having a thickness of 100 μm was formed on the steel base member 1 and was then subject to heat treatment at 530° C. for two hours. The Ni—P coating was crystallized, thereby forming the machined layer 2. After the machined layer 2 was worked by means of a turning diamond tool, a mold-releasing layer 4 made of Ir-25% Re by weight and having a thickness of 300 nm was formed by sputtering. In this manner, the glass-shaping mold 6 was manufactured.

According to Example 2, the surface roughness Ra was satisfactory after the elapse of 32 hours, as in Example 1. However, the separation of the mold-releasing layer was observed at the periphery although the separation was slight.

EXAMPLE 3

Figure 4:
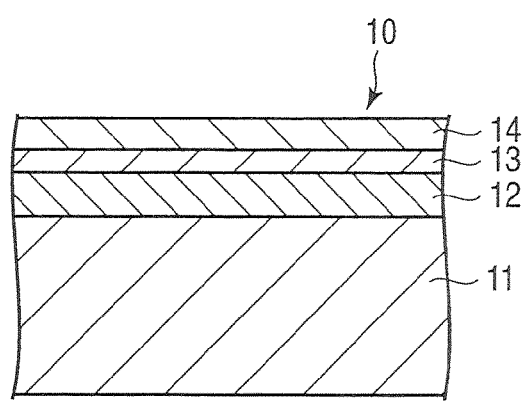
FIG. 4 is a partial cross section showing a glass-shaping mold according to Example 3 of the present invention.

FIG. 4 is a partial cross section showing a glass-shaping mold according to Example 3 of the present invention. Reference numeral 11 in FIG. 4 denotes a steel base member. A crystallized, machined layer 12, an intermediate layer 13 and a mold-releasing layer 14 are sequentially formed on the base member 11. The machined layer 12 is a layer of nickel alloy containing 10% by weight of P (phosphorus), i.e., a (Ni-10 wt % P) layer. The intermediate layer 13 is a layer made of nickel (Ni). The releasing layer 14 is a layer of an alloy containing iridium (Ir), rhenium (Re) and 3 at %-carbon (C).

The glass-shaping mold 10 shown in FIG. 4 is manufactured as follows: First, a nonelectrolyte Ni—P coating having a thickness of 100 μm was formed on the steel base member 1 and was then subject to heat treatment at 530° C. for two hours. The Ni—P coating was crystallized, thereby forming the machined layer 12. After the machined layer 12 was worked by means of a turning diamond tool, an intermediate layer 13 made of Ni and having a thickness of 50 nm and a mold-releasing layer 14 made of Ir—Re—C and having a thickness of 300 nm were formed by sputtering. In this manner, the glass-shaping mold 10 was manufactured.

As shown in FIG. 4, the glass-shaping mold 10 according to Example 3 has a structure wherein the base member 11 is overlaid with: a nickel alloy layer (machined layer) 12 containing 10% by weight of P; an intermediate layer 13 made of Ni; and a mold-releasing layer 4 containing Ir, Re and C. These layers are formed sequentially. When the mold 5 is manufactured, the machined layer 12 is formed and is then heated to be crystallized. Subsequently, the intermediate layer 13 and the mold-releasing layer 14 are sequentially formed. Thus, the surface roughness of the mold-releasing layer 14 is not degraded during shaping, and the fusion and adhesion of glass are prevented.

The glass fusion/adhesion state and the surface roughness were actually measured after heat treatment performed at 470° C., using the mold according to Example 3 and the molds according to Comparative Examples 5 and 6. The result is shown in Table 1 set forth below. Example 3 indicates the case where the steel compositions of the mold-releasing layer, intermediate layer, machined layer and base member are (Ir—Re—C), Ni, (Ni—P) and Steel, respectively. Comparative Example 5 indicates the case where the same steel compositions are (Ir—Pt), Ni, (Ni—P) and Steel, respectively. Comparative Example 6 indicates the case where the steel compositions are (Ir—Re), Ni, (Ni—P) and Steel, respectively. As can be seen from the result, it should be clear that the present invention is superior to the Comparative Examples.

TABLE 1

| | Composition of mold releasing layer/intermediate layer/machined layer/base member | Fusion and adhesion of glass | Surface roughness of mold |
| --- | --- | --- | --- |
| Example 3 | Ir—Re—C/Ni/Ni—P/Steel | No fusion or adhesion occurred after 500 shots | Ra 2 nm |
| Comparative Example 5 | Ir—Pt/Ni/Ni—P/Steel | Fusion and adhesion occurred after one shot | Ra 8 nm |
| Comparative Example 6 | Ir—Re/Ni/Ni—P/Steel | Fusion and adhesion occurred after one shot | Ra 2 nm |

From Table 1, it is clear that fusion and adhesion occurred after "one shot" in the cases of Comparative Examples 5 and 6, whereas they did no occur even after "500 shots" in the case of Example 3. The metal surface roughness was Ra 8 nm in the case of Comparative Example 5, whereas it was Ra 2 nm in the case of Example 3. From Table 1, it can be understood that present invention is superior to the Comparative Examples in terms of the fusion and adhesion of glass and the surface roughness of the mold.

EXAMPLE 4

Figure 5:
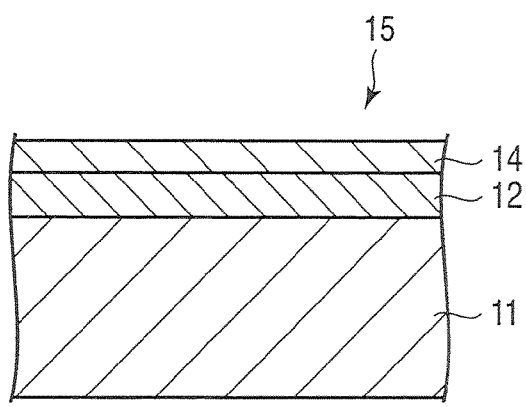
FIG. 5 is a partial cross section showing a glass-shaping mold according to Example 4 of the present invention.

FIG. 5 is a partial cross section showing a glass-shaping mold according to Example 4 of the present invention. The corresponding members to those in FIG. 4 are denoted by the same reference numerals, and a description of them will be omitted. The glass-shaping mold 15 has a structure wherein a steel base member 11 is overlaid with a crystallized, machined layer 12 and a mold releasing layer 14 which are sequentially formed.

The glass-shaping mold 15 shown in FIG. 5 is manufactured as follows: First, a nonelectrolyte Ni—P coating having a thickness of 100 μm was formed on the steel base member 11 and was then subject to heat treatment at 530° C. for two hours. The Ni—P coating was crystallized, thereby forming the machined layer 12. After the machined layer 12 was worked by means of a turning diamond tool, a mold releasing layer 14 made of Ir—Re—C and having a thickness of 300 nm was formed by sputtering. In this manner, the glass-shaping mold 15 was manufactured.

Example 4 was slightly inferior to Example 3 in terms of the adhesion between the machined layer 12 and the mold-releasing layer 14, but is similar to Example 3 in terms of the fusion and adhesion of glass and the surface roughness of the mold.

The present invention is not limited to the Examples described above, and the structural elements of the invention can be modified in various manners without departing from the spirit and scope of the present invention. It should be noted that the structural elements described in relation to the foregoing Examples can be properly combined to create a variety of inventions. For example, some of the structural elements can be deleted from each Example. In addition, structural elements of different Examples may be properly combined. To be more specific, the materials, compositions, thicknesses etc. of the structural elements described above are no more than examples, and the present invention is in no way limited to them.

What is claimed is:

1. A glass-shaping mold comprising a steel base member, and a crystallized, machined layer, an intermediate layer, and a mold-releasing layer, which are sequentially formed on the base member,
   wherein the machined layer is a layer of a nickel alloy containing a phosphorus in concentration of 1% to 15% by mass,
   the intermediate layer comprises at least one element selected from the group consisting of chromium, nickel, copper, and cobalt; and
   the mold-releasing layer is a layer of nickel alloy containing iridium, rhenium and carbon, the carbon concentration being 1 at % to 50 at %.

2. A method of manufacturing a glass-shaping mold comprising the steps of:
   forming a machined layer on a base member, the machined layer comprising a nickel alloy containing a phosphorus in concentration of 1% to 15% by mass;
   heating the machined layer to crystallize the machined layer;
   working the machine layer with a turning diamond tool subsequent to the heating step; and
   forming an the intermediate layer and a mold-releasing layer on the machined layer, the intermediate layer comprising at least one element selected from the group consisting of chromium, nickel, copper, and cobalt; and the mold-releasing layer being a layer of nickel alloy containing iridium, rhenium and carbon, the carbon concentration being 1 at % to 50 at %.

* * * * *